US007001934B2

(12) United States Patent
Bromberg

(10) Patent No.: US 7,001,934 B2
(45) Date of Patent: Feb. 21, 2006

(54) INKJET INK SYSTEMS COMPRISING A GELLING AGENT

(75) Inventor: Lev Bromberg, Swampscott, MA (US)

(73) Assignee: Cabot Coroporation, Boston, MA (US)

(*) Notice: Subject to any disclaimer, the term of this patent is extended or adjusted under 35 U.S.C. 154(b) by 122 days.

(21) Appl. No.: 10/056,777

(22) Filed: Jan. 24, 2002

(65) Prior Publication Data
US 2003/0153649 A1 Aug. 14, 2003

(51) Int. Cl.
C09D 11/10 (2006.01)
C08L 33/02 (2006.01)
C08L 33/08 (2006.01)
C08L 33/10 (2006.01)
C08L 71/02 (2006.01)
B41J 2/01 (2006.01)
B41M 5/00 (2006.01)

(52) U.S. Cl. ............... 523/160; 524/556; 524/560; 524/612; 347/100; 428/32.11

(58) Field of Classification Search ........... 523/160, 523/161; 106/31.27, 31.6; 524/504, 505, 524/556, 560, 612; 347/100; 428/32.26, 428/32.11, 32.1
See application file for complete search history.

(56) References Cited

U.S. PATENT DOCUMENTS

| 3,479,300 | A |   | 11/1969 | Rivin et al. ............... 252/430 |
| 4,014,844 | A |   | 3/1977  | Vidal et al. ............ 260/31.2 R |
| 4,946,509 | A |   | 8/1990  | Schwartz et al. .......... 106/496 |
| 5,281,261 | A |   | 1/1994  | Lin et al. ................ 106/20 R |
| 5,418,277 | A |   | 5/1995  | Ma et al. .................... 524/520 |
| 5,476,540 | A | * | 12/1995 | Shields et al. ............ 524/251 |
| 5,545,504 | A |   | 8/1996  | Keoshkerian et al. ....... 430/137 |
| 5,554,739 | A |   | 9/1996  | Belmont ..................... 534/885 |
| 5,571,311 | A | * | 11/1996 | Belmont et al. ......... 106/31.28 |
| 5,630,868 | A |   | 5/1997  | Belmont et al. ......... 106/31.75 |
| 5,698,016 | A |   | 12/1997 | Adams et al. .............. 106/316 |
| 5,708,095 | A | * | 1/1998  | Grezzo Page et al. ...... 525/301 |
| 5,713,988 | A |   | 2/1998  | Belmont et al. .......... 106/31.6 |
| 5,714,993 | A |   | 2/1998  | Keoshkerian et al. ........ 347/95 |
| 5,837,045 | A |   | 11/1998 | Johnson et al. .......... 106/31.85 |
| 5,851,280 | A |   | 12/1998 | Belmont et al. ............ 106/472 |
| 5,885,335 | A |   | 3/1999  | Adams et al. .............. 106/316 |
| 5,895,522 | A |   | 4/1999  | Belmont et al. .......... 106/31.6 |
| 5,900,029 | A |   | 5/1999  | Belmont et al. ............... 8/550 |
| 5,914,806 | A |   | 6/1999  | Gordon II et al. ........... 359/296 |
| 5,922,118 | A |   | 7/1999  | Johnson et al. .......... 106/31.6 |
| 5,952,429 | A |   | 9/1999  | Ikeda et al. ............... 525/326.1 |
| 5,964,935 | A |   | 10/1999 | Chen et al. ................ 406/401 |
| 5,968,243 | A |   | 10/1999 | Belmont et al. ......... 106/31.65 |
| 5,969,740 | A | * | 10/1999 | Maeda et al. ............... 347/101 |
| 5,976,233 | A |   | 11/1999 | Osumi et al. ............ 106/31.75 |
| 5,989,325 | A | * | 11/1999 | Sacripante et al. ....... 106/31.27 |
| 6,022,908 | A | * | 2/2000  | Ma et al. ..................... 523/160 |
| 6,042,643 | A |   | 3/2000  | Belmont et al. ............ 106/472 |
| 6,068,688 | A |   | 5/2000  | Whitehouse et al. ..... 106/31.65 |
| 6,103,380 | A |   | 8/2000  | Devonport .................... 428/403 |
| 6,110,994 | A | * | 8/2000  | Cooke et al. ................ 523/215 |
| 6,117,921 | A | * | 9/2000  | Ma et al. ..................... 523/161 |
| 6,123,760 | A | * | 9/2000  | Varnell et al. ............. 106/174.1 |
| 6,150,433 | A |   | 11/2000 | Tsang et al. ................. 523/160 |
| 6,221,143 | B1 |  | 4/2001  | Palumbo ..................... 106/31.6 |
| 6,221,932 | B1 |  | 4/2001  | Moffatt et al. .............. 523/160 |
| 6,235,829 | B1 |  | 5/2001  | Kwan .......................... 524/495 |
| 6,281,267 | B1 |  | 8/2001  | Parazak ....................... 523/160 |
| 6,458,458 | B1 |  | 10/2002 | Cooke et al. ................ 428/407 |
| 6,472,471 | B1 |  | 10/2002 | Cooke et al. ................ 525/165 |
| 2001/0036994 | A1 | | 11/2001 | Bergemann et al. ........ 524/495 |

FOREIGN PATENT DOCUMENTS

| EP | 0 677 556 A2 | 10/1995 |
| EP | 0 688 836 A2 | 12/1995 |
| EP | 0 839 883 A2 | 5/1998 |
| EP | 1148104 A1 * | 10/2001 |
| GB | 2 330 842 | 5/1999 |
| JP | 57-21466 | 2/1982 |
| JP | 6-128517 | 5/1994 |
| WO | WO97/47697 | 12/1997 |
| WO | WO99/23174 | 5/1999 |
| WO | WO99/31175 | 6/1999 |
| WO | WO99/38921 | 8/1999 |
| WO | WO99/51690 | 10/1999 |
| WO | WO99/63007 | 12/1999 |
| WO | WO00/05313 | 2/2000 |
| WO | WO00/22051 | 4/2000 |
| WO | WO 00/37168 A1 * | 6/2000 |
| WO | WO00/43446 | 7/2000 |
| WO | WO00/52102 | 10/2000 |
| WO | WO00/68321 | 11/2000 |
| WO | WO01/25340 | 4/2001 |
| WO | WO01/51566 | 7/2001 |
| WO | WO03/08509 | 1/2003 |

OTHER PUBLICATIONS

International Search Repot for PCT/US03/02350, mailed Apr. 22, 2003.
JP11246806 A to Toyo Ink Mfg. Co. Ltd. Publication Date Sep. 14, 1999 Abstract Only (from Patent Abstracts of Japan).

(Continued)

Primary Examiner—Callie Shosho

(57) ABSTRACT

Inkjet ink systems are disclosed which comprise a) a liquid vehicle, b) a colorant, and c) a gelling agent. The gelling agent may be incorporated either into the liquid vehicle, into a second jettable composition, or onto a substrate. The gelling agent may also be attached to the colorant. In addition, several methods of generating an image are also described which utilize compositions comprising a gelling agent.

37 Claims, 3 Drawing Sheets

OTHER PUBLICATIONS

JP11080636 A to Canon Inc., Publication Date Mar. 26, 1999 Abstract Only (from Patent Abstracts of Japan).
JP11256066 A to Tokai Carbon Co. Ltd., Publication Date Sep. 21, 1999 Abstract Only (from Patent Abstracts of Japan).

*Handbook of Surfaces and Interfaces of Materials*, vol. 4, 2001, Chapter 7, "Hydrophobically Modified Polyelectrolytes and Polyelectrolyte Block Copolymers", Bromberg.

\* cited by examiner

R= $C_{12}$, $C_{16}$, $C_{20}$ alkyl, complex alkylaryl, etc.

INKJET INK SYSTEMS COMPRISING A GELLING AGENT

BACKGROUND OF THE INVENTION

1. Field of the Invention

The present invention relates to an inkjet ink system comprising a liquid vehicle, a colorant, and a gelling agent. Methods of printing using this inkjet ink system are also disclosed.

2. Description of the Related Art

An inkjet ink composition generally consists of a vehicle, which functions as a carrier, and a colorant such as a dye or pigment. Additives and/or cosolvents can also be incorporated in order to adjust the inkjet ink to attain the desired overall performance properties.

In general, pigments alone are not readily dispersible in liquid vehicles. A variety of techniques have been developed which can provide stable pigment dispersions which can be used in inkjet printing. For example, dispersants can be added to the pigment to improve its dispersibility in a particular medium. Examples of dispersants include water-soluble polymers and surfactants. Typically, these polymeric dispersants have a molecular weight less than 20,000 in order to maintain solubility and therefore pigment stability.

Recently, modified pigments have also been developed which provide ink compositions with improved properties, such as dispersibility, without the need for an external dispersant. For example, U.S. Pat. No. 5,851,280 discloses methods for the attachment of organic groups onto pigments including, for example, attachment via a diazonium reaction wherein the organic group is part of the diazonium salt. The resulting surface-modified pigments can be used in a variety of applications, such as inks, inkjet inks, coatings, toners, plastics, rubbers, and the like. These modified pigments provide inkjet inks with good overall properties.

Polymers other than dispersants have also been incorporated into inkjet ink compositions in an effort to improve performance. For example, emulsion polymers or latexes have been used as an additive to improve the print performance of inkjet inks. Since an emulsion polymer typically has a high molecular weight, this enables the use of higher molecular weight materials in an inkjet ink application. However, as emulsion polymers, these polymers are not soluble and would tend to lead to difficulties in printing, particularly nozzle clogging.

Other polymer-based inks are also known. For example, U.S. Pat. No. 6,281,267 describes an inkjet ink set comprising a first ink comprising a pH-sensitive polymer and a self-dispersing pigment and a second ink. When the first ink comes in contact with the second ink on a print medium, the polymer becomes insoluble and precipitates onto the print medium. This ink set is believed to have improved bleed and halo control.

Thus, as the inkjet printing industry moves towards print performance similar to that of laser printing, there remains a need for additional inkjet ink compositions and systems with improved print properties, such as improved print durability.

SUMMARY OF THE INVENTION

The present invention relates to an inkjet ink system comprising a) a liquid vehicle, b) a colorant, and c) a gelling agent. The gelling agent may be incorporated into the liquid vehicle to form an inkjet ink composition, into a second jettable composition, or onto a substrate. The gelling agent may also be attached to the colorant itself. Preferably the colorant is a pigment. Also, the gelling agent is preferably a hydrophobically modified polyelectrolyte.

The present invention further relates a method of generating a printed image comprising the steps of: i) incorporating into a printing apparatus an inkjet ink composition comprising a) a liquid vehicle, b) a colorant, and c) a gelling agent; ii) jetting the inkjet ink composition; and iii) generating an image onto a substrate. The substrate may optionally comprise a gelling agent, which can be the same or different from the gelling agent of the inkjet ink composition.

The present invention further relates to a method of generating a printed image comprising the steps of i) incorporating into a printing apparatus an inkjet ink composition comprising a) a liquid vehicle and b) a colorant; ii) incorporating into a printing apparatus a gelling agent composition comprising a) a liquid vehicle and b) a gelling agent; iii) jetting, in any order, the inkjet ink composition and the gelling agent composition; and iv) generating an image. This method may further comprise jetting a second gelling agent composition comprising a) a liquid vehicle and b) a gelling agent before the jetting of the inkjet ink composition.

The present invention further relates to a method of generating a printed image comprising the steps of: i) incorporating into a printing apparatus an inkjet ink composition comprising a) a liquid vehicle and b) a colorant; ii) jetting the inkjet ink composition; and iii) generating an image onto a substrate, wherein the substrate comprises a gelling agent.

It is to be understood that both the foregoing general description and the following detailed description are exemplary and explanatory only and are intended to provide further explanation of the present invention, as claimed.

DETAILED DESCRIPTION OF THE INVENTION

Figure 1:
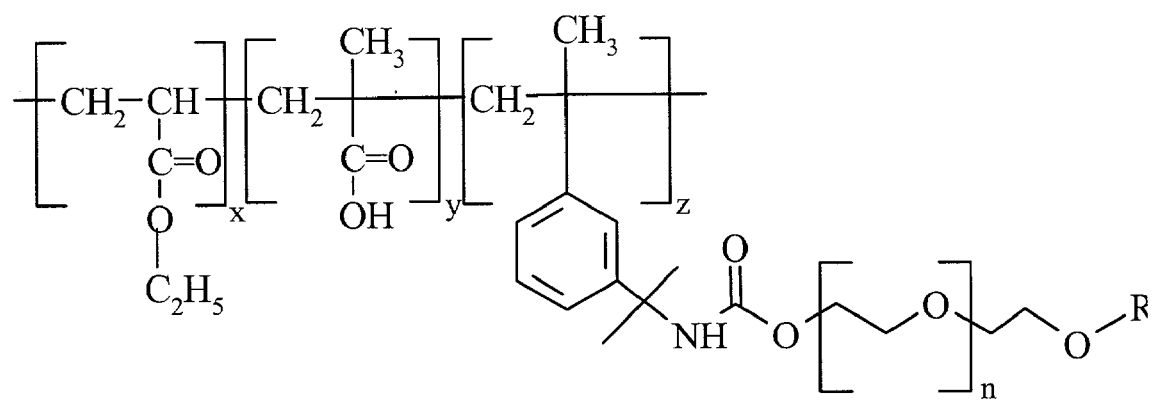
FIG. 1 is a formula of a hydrophobically modified polymeric gelling agent containing a hydrophobic block, an ionic or ionizable block, and a hydrophilic block used in the present invention.

The present invention relates to inkjet ink systems comprising a) a liquid vehicle; b) a colorant; and c) a gelling agent, as well as to methods of printing.

The inkjet ink systems of the present invention comprise a liquid vehicle and a colorant. The vehicle can be either an aqueous or non-aqueous liquid vehicle, but is preferably a vehicle that contains water. Thus, the vehicle is preferably an aqueous vehicle, which can be, for example, water or mixtures of water with water miscible solvents such as alcohols. Preferably the aqueous vehicle is water, and the inkjet ink system is an aqueous inkjet ink system.

The colorant in the inkjet ink systems of the present invention can be either a dye or a pigment. The dye can be either soluble or insoluble in the liquid vehicle. Preferably, the colorant is a pigment or a dye that is not soluble in the liquid vehicle. Examples of such dyes include those referred to as dispersed dyes, which are soluble in organic solvents such as toluene but are not soluble in water. Other such dyes will be known to those skilled in the art.

The pigment can be any type of pigment conventionally used by those skilled in the art, such as black pigments and other colored pigments. Preferably, when the pigment is a black pigment, the pigment is carbon black. Mixtures of different pigments can also be used. These pigments can also be used in combination with a variety of different types of dispersants in order to form stable dispersions and inks.

Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P). Other suitable carbon blacks include, but are not limited to, Printex 40, Printex 80, Printex 300, Printex L, Printex U, Printex V, Special Black 4, Special Black 5, FW200, (the foregoing available from Degussa Corporation), Raven 780, Raven 890, Raven 1020, Raven 1040, Raven 1255, Raven 1500, Raven 5000, Raven 5250 (the foregoing available from Colombian Chemical Corporation) and MA100 and MA440 available from Mitsubishi Chemical Corporation.

The pigment may also be chosen from a wide range of conventional colored pigments. The colored pigment can be blue, black, brown, cyan, green, white, violet, magenta, red, orange, yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982).

Other examples of pigments include Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), Normandy Magenta RD-2400, Paliogen Violet 5100, Paliogen® Violet 5890, Permanent Violet VT2645, Heliogen Green L8730, Argyle Green XP-111-S, Brilliant Green Toner GR 0991, Heliogen® Blue L6900, L7020, Heliogen® Blue D6840, D7080, Sudan Blue OS, PV Fast Blue B2GO1, Irgalite Blue BCA, Paliogen® Blue 6470, Sudan III, Sudan II, Sudan IV, Sudan Orange G, Sudan Orange 220, Paliogen® Orange 3040, Ortho Orange OR 2673, Paliogen® Yellow 152, 1560, Lithol Fast Yellow 0991K, Paliotol Yellow 1840, Novoperm® Yellow FG 1, Permanent Yellow YE 0305, Lumogen Yellow D0790, Suco-Gelb L1250, Suco-Yellow D1355, Hostaperm® Pink E, Fanal Pink D4830, Cinquasia Magenta, Lithol Scarlet D3700, Toluidine Red, Scarlet for Thermoplast NSD PS PA, E.D. Toluidine Red, Lithol Rubine Toner, Lithol Scarlet 4440, Bon Red C, Royal Brilliant Red RD-8192, Oracet Pink RF, Paliogen® Red 3871K, Paliogen® Red 3340, and Lithol Fast Scarlet L4300. These are available from sources such as Hoechst Celanese Corporation, Paul Ulhlich, BASF, American Hoechst, Ciba-Geigy, Aldrich, DuPont, Ugine Kuhlman of Canada, Dominion Color Company, Magruder, and Matheson, Coleman, Bell.

The colorant can also be a modified pigment which comprises a pigment having an attached organic group. The pigment having an attached organic group can be formed from any of the pigments described above. The starting pigment can have a wide range of BET surface areas, as measured by nitrogen adsorption. Preferably, the pigment has a surface area greater than or equal to 85 $m^2/g$, and more preferably greater than or equal to about 100 $m^2/g$, thereby corresponding to a smaller primary/aggregate particle size. Such surface areas have been found to provide for a more uniform distribution and efficient level of treating agent on the pigment and a higher percent yield of the modified pigment after post processing techniques. If the preferred higher surface area of the pigment (thereby corresponding to a smaller particle size) is not readily available, it is well recognized by those skilled in the art that the pigment may be subject to conventional size comminution or reduction techniques, such as ball or jet milling, to reduce the pigment to the desired particle size.

Preferably, the organic group of the modified pigment comprises at least one ionic group, ionizable group, or mixtures of an ionic group and an ionizable group. An ionic group is either anionic or cationic and is associated with a counterion of the opposite charge including inorganic or organic counterions such as $Na^+$, $K^+$, $Li^+$, $NH_4^+$, $NR'_4^+$, acetate, $NO_3^-$, $SO_4^{-2}$, $R'SO_3^-$, $R'OSO_3^-$, $OH^-$, and $Cl^-$, where R' represents hydrogen or an organic group such as a substituted or unsubstituted aryl and/or alkyl group. An ionizable group is one that is capable of forming an ionic group in the medium of use. Organic ionic groups include those described in U.S. Pat. No. 5,698,016, the description of which is fully incorporated herein by reference.

The organic group can comprise at least one anionic or anionizable group. Anionic groups are negatively charged ionic groups that may be generated from groups having ionizable substituents that can form anions (anionizable groups), such as acidic substituents. They may also be the anion in the salts of ionizable substituents. Preferably, when the ionizable substituent forms an anion, the ionizable substituent has a $pK_a$ of less than 11. The anionic group could further be generated from a species having ionizable groups with a $pK_a$ of less than 11 and salts of ionizable substituents having a $pK_a$ of less than 11. The $pK_a$ of the ionizable substituent refers to the $pK_a$ of the ionizable substituent as a whole, not just the acidic substituent. More preferably, the $pK_a$ is less than 10 and most preferably less than 9.

Representative examples of anionic groups include —COO⁻, —SO₃⁻, —OSO₃⁻, —HPO₃⁻, —OPO₃⁻², and —PO₃⁻². Representative examples of anionizable groups include —COOH, —SO₃H, —PO₃H₂, —R'SH, —R'OH, and —SO₂NHCOR', where R' represents hydrogen or an organic group such as a substituted or unsubstituted aryl and/or alkyl group. Preferably, the anionic or anionizable group is a carboxylic acid group, a sulfonic acid group, a phoshonic acid group, or salts thereof.

The organic group may also comprise at least one cationic or cationizable group. Cationic groups are positively charged organic ionic groups that may be generated from ionizable substituents that can form cations (cationizable groups), such as protonated amines. For example, alkyl or aryl amines may be protonated in acidic media to form ammonium groups —NR'₂H⁺, where R' represent an organic group such as a substituted or unsubstituted aryl and/or alkyl group. Preferably, the amine has a $pK_b$ of less than 5. Cationic groups may also be positively charged organic ionic groups. Examples include quaternary ammonium groups (—NR'₃⁺) and quaternary phosphonium groups (—PR'₃⁺). Here, R' represents hydrogen or an organic group such as a substituted or unsubstituted aryl and/or alkyl group. Preferably, the cationic or cationizable group is an amine group or a salt thereof.

The organic group may also comprise polymeric groups. Preferably, the polymeric groups comprise the ionic or ionizable groups described above. Thus, the organic group may be a polymeric group comprising one or more anionic or anionizable groups. Examples include, but are not limited to, polyacids such as polyacrylic acid, polymethacrylic acid, copolymers of acrylic acid or methacrylic acid, including styrene-acrylic acid polymers, and hydrolyzed derivatives of maleic anhydride-containing polymers.

The organic group may also comprise a polymeric group comprising one or more cationic or cationizable groups. Examples include, but are not limited to, linear or branched polyamines such as polyethyleneimine (PEI), oligomers of ethyleneimine (such as pentaethyleneamine, PEA) and derivatives of polyethyleneimine.

The organic group may also comprise a polymeric group comprising one or more non-ionic groups. Examples include alkylene oxide groups of from about 1 to about 12 carbons. Examples of preferred alkylene oxide groups include, but are not limited to, —CH₂—CH₂—O—; —CH(CH₃)—CH₂—O—; —CH₂—CH(CH₃)—O—, —CH₂CH₂CH₂—O—, or combinations thereof.

For example, the organic group may be a group represented by the formula —X-Sp-[Polymer]R. X, which is directly attached to the pigment, represents an arylene or heteroarylene group or an alkylene group and is substituted with an Sp group. Sp represents a spacer group. The group Polymer represents a polymeric group comprising repeating monomer groups or multiple monomer groups or both. R represents hydrogen, a bond, a substituted or unsubstituted alkyl group, or a substituted or unsubstituted aryl group. Preferably, at least one type of monomer group comprises at least one ionic or ionizable group. The group Polymer can be further substituted with additional groups. The total number of monomer repeating units that comprise the group Polymer is preferably not greater than about 500 monomer repeating units.

The group Polymer can be any type of polymeric group such as, for example, a thermoplastic polymeric group or a thermosetting polymeric group. Further, the polymeric group can be a homopolymer, copolymer, terpolymer, and/or a polymer containing any number of different repeating units. Further, the group Polymer can be a random polymer, alternating polymer, graft polymer, block polymer, star-like polymer, and/or comb-like polymer. Preferred examples of the group Polymer are those described above.

The group Sp represents a spacer group which, as used herein, is a link between two groups. The group Sp can be a bond or a chemical group. Examples of chemical groups include, but are not limited to, —CO₂—, —O₂C—, —CO—, —OSO₂—, —SO₃—, —SO₂—, —SO₂C₂H₄O—, —SO₂C₂H₄S—, —SO₂C₂H₄NR—, —O—, —S—, —NR—, —NRCO—, —CONR—, —NRCO₂—, —O₂CNR—, —NRCONR—, —NRCOCH(CH₂CO₂R)—, —NRCOCH₂CH(CO₂R)—, —N(COR)(CO)—, imide groups, arylene groups, alkylene groups and the like. R, which can be the same or different, represents hydrogen or an organic group such as a substituted or unsubstituted aryl or alkyl group.

The group X represents an arylene or heteroarylene group or an alkylene group. X is directly attached to the pigment and is further substituted with an Sp group. The aromatic group can be further substituted with any group, such as one or more alkyl groups or aryl groups. Preferably, the arylene group is phenylene, naphthylene, or biphenylene, and the heteroarylene group. When X represents an alkylene group, examples include, but are not limited to, substituted or unsubstituted alkylene groups which may be branched or unbranched. The alkylene group can be substituted with one or more groups, such as aromatic groups. Examples include, but are not limited to, $C_1$–$C_{12}$ groups like methylene, ethylene, propylene, or butylene, groups. Preferably, X is an arylene group.

The group X may be substituted with one or more functional groups. Examples of functional groups include, but are not limited to, R''', OR''', COR''', COOR''', OCOR''', carboxylates, halogens, CN, NR'''₂, SO₃H, sulfonates, sulfates, NR'''(COR'''), CONR'''₂, NO₂, PO₃H₂, phosphonates, phosphates, N=NR''', SOR''', NSO₂R''', wherein R''' which can be the same or different, is independently hydrogen, branched or unbranched $C_1$–$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

As shown by the structure above, the group Polymer is attached to the pigment through the spacer group Sp. However, it will also be recognized that when R represents a bond, the available bond can also be attached to the pigment. In addition, the group Polymer can also be attached to the pigment at multiple points along the polymer chain through proper choice of substituent groups on the repeating monomer units. These substituents may also comprise spacer groups or —X-Sp-groups as described above. Thus, these groups can be attached to the pigment at either end or at points along the backbone. Further, these groups can be any type of polymeric group, such as a random polymer, alternating polymer, graft polymer, block polymer, star-like polymer, and/or comb-like polymer.

The organic group may also comprise a gelling agent, preferably a polymeric gelling agent. These gelling agents are described in more detail below.

The modified pigments used in the inkjet ink systems of the present invention are modified using methods known to those skilled in the art such that organic groups are attached to the pigment. For example, the modified pigments used in the dispersions of the present invention can be prepared using the methods described in U.S. Pat. Nos. 5,851,280, 5,698,016, 5,922,118, and 5,837,045, and PCT Publication Nos. WO 99/51690 and WO 00/22051, the descriptions of which are fully incorporated herein by reference. This provides a more stable attachment of the groups on the pigment compared to adsorbed groups, such as polymers, surfactants, and the like.

The modified pigments may also comprise a pigment having attached at least one organic group, wherein the organic group comprises the reaction product of a pigment having attached a first chemical group with a second chemical group to form a pigment having attached a third organic group. For this, the modified pigments can be prepared using methods known to those skilled in the art. For example, the modified pigments may be prepared using the method described in PCT Publication No. WO 01/51566, which is incorporated in its entirety herein by reference. Thus, for example, the organic group may comprise the reaction product of at least one electrophile, such as a (2-sulfatoethyl)-sulphone group or a benzoic acid group, and at least one nucleophilic polymer, such as a polyamine. Further reactions on these attached organic groups, such as acylation reactions, are also possible. Other examples are also disclosed in the above-cited reference.

The amount of the attached organic groups can be varied in order to attain the desired performance attributes. Preferably, the total amount of attached organic groups is from about 0.01 to about 10.0 micromoles of organic group/$m^2$ surface area of pigment, as measured by nitrogen adsorption (BET method). For example, the amount of attached organic groups is between from about 0.5 to about 4.0 micromoles/$m^2$. In addition, the modified pigments may further comprise additional attached organic groups. This can result in further improved properties.

The modified pigments may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art.

The colorants are used in the inkjet ink systems of the present invention in an amount effective to provide the desired image quality (for example, optical density) without detrimentally affecting print performance. Preferably the colorant is incorporated in the liquid vehicle to form an inkjet ink composition and is present in an amount ranging from about 0.1% to about 20%, most preferably 1% to 5%, based on the weight of the inkjet ink composition. It is also within the bounds of the present invention to use a formulation containing a mixture of modified pigments described herein and unmodified pigments, other modified pigments, or both.

The inkjet ink systems of the present invention further comprise at least one gelling agent. As used herein, a gelling agent is a material that, when incorporated into a composition, can form either a physical or chemical network either with itself or with other components in the composition, causing the system to set or gel.

Preferably, the gelling agents used in the inkjet ink systems of the present invention are polymeric gelling agents. A preferred example includes those polymeric gelling agents known as hydrophobically modified polyelectrolytes (HMPs). Examples of classes of these types of gelling agents include acrylamide-acrylic acid terpolymers, poly(sodium maleate-alkyl vinyl ethers), hydrophobe modified alkali-soluble emulsion polymers (HASE polymers), hydrophobically modified poly(sodium 2-acrylamido-2-methylpropanesulfonates), hydrophobically modified poly (acrylic acids) (HMPAAs), poly(N-alkylacrylamide)-polyelectrolyte conjugates, and hydrophobically modified naturally occurring polymers such as chitosan, ionic cellulose ethers, pectin, alginates, and carboxypullulan. These types of polymers have been reviewed by L. Bromberg in Chapter 7 of *Handbook of Surfaces and Interfaces of Materials*, Vol. 4, 2001, titled *"Hydrophobically Modified Polyelectrolytes and Polyelectrolyte Block Copolymers,"* which is incorporated in its entirety herein by reference.

A preferred class of hydrophobically modified polyelectrolyte gelling agents are those which comprise at least one hydrophobic monomer unit and at least one ionic or ionizable polymer unit. Examples of hydrophobic monomer units include, but are not limited to, alkyl vinyl ethers and alkyl and fluoroalkyl esters and amides of acrylic acid, methacrylic acid, and maleic acid. Preferably, the hydrophobic monomer group is an alkyl ester of acylic acid or an alkyl ester of methacrylic acid. Examples of ionic or ionizable monomer units are those that comprise a carboxylic acid group or salt thereof such as acrylic acid, methacrylic acid, maleic acid, and salts thereof. Another example is 2-methylpropanesulfonate (AMPS). Preferably the ionic or ionizable monomer unit is acrylic acid, methacrylic acid, or salts thereof.

Most preferred are those gelling agents that further comprise a hydrophilic monomer unit. The hydrophilic monomer unit, as used herein, is a non-ionic hydrophile. Examples include, but are not limited to, acrylamide and esters of acrylic and methacrylic acid comprising an alkylene oxide group, such as a polyethylene oxide (PEO) group, a polypropylene oxide (PPO) group, or a ethylene oxide-propylene oxide block copolymer group. Preferably the hydrophilic monomer unit is a polyethylene oxide ester of acrylic or methacrylic acid.

The gelling agents used in the inkjet ink systems of the present invention can be any type of polymeric material, such as a random copolymer, an alternating copolymer, a graft copolymer, a dendrimer, or a block copolymer, including a segmented block copolymer or a star block copolymer. Preferably the gelling agent is a block copolymer or a graft copolymer. The blocks or grafts can comprise any of the different types of monomer units described above. Thus, for example, the gelling agent may be a triblock polymer comprising blocks of hydrophilic monomer units, hydrophobic monomer units, and ionic or ionizable monomer units. Other arrangements of monomer units will be known to one skilled in the art.

The molecular weight of the gelling agent can vary depending on the types of monomer units comprising it, so long as the material functions as a gelling agent as herein defined. Preferably, the gelling agent has a weight average molecular weight of between 1,000 and 3,000,000 and more preferably between 300,000 and 1,500,000. If the molecular weight is too low, the gelling agent will not produce a well-formed network and, if it is too high, ink stability may be affected.

In one embodiment, the gelling agent is incorporated into the liquid vehicle to form an inkjet ink composition. In another embodiment, the gelling agent is incorporated into a second jettable composition, which may also be referred to as an inkjet ink composition. For both of these embodiments, the gelling agent can be used in amounts ranging between 0.1% and 60%, preferably 1% and 50%, by weight based on the total weight of the inkjet ink composition. Most preferred is an amount of gelling agent of between 5% and 40% by weight based on the total weight of the inkjet ink composition.

In another embodiment, the gelling agent is attached to the colorant. Preferably, the colorant is a modified pigment having attached at least one gelling agent. In another embodiment, the gelling agent is incorporated onto a substrate, that is, either as a component of the substrate or as a coating on the surface of the substrate.

When used in combination with a modified pigment having an attached organic group, it is preferred that the pigment and the gelling agent do not have opposing charges. Thus, examples of preferred combinations of modified pigments and gelling agents include modified pigments having an attached ionic or ionizable group and a gelling agent comprising an ionic or ionizable monomer unit, where both the ionic or ionizable group and the ionic or ionizable monomer unit are anionic or anionizable. If the ionic or ionizable group is cationic or cationizable, then it is preferred that the ionic or ionizable monomer unit of the gelling agent also be cationic or cationizable.

One skilled in the art would recognize that both the amount of gelling agent and the more preferred molecular weights represent much higher values than has been used for conventional dispersing agents. For example, conventional dispersing agents typically have weight average molecular weights less that 20,000. This is due to difficulties encountered in solubility and jetting. It has surprisingly been found that these gelling agents can be used in jettable compositions despite their higher molecular weights.

The inkjet ink compositions may be purified or classified to remove impurities and other undesirable free species which can co-exist in the inkjet ink composition as a result of the manufacturing process. For example, the inkjet ink composition can be purified to remove any undesired free species, such as unreacted treating agent. Known techniques of ultrafiltration/diafiltration using a membrane or ion exchange may be used to purify the dispersion and remove a substantial amount of free ionic and unwanted species. An optional exchange of counterions step may also occur in the purification process whereby the counterions that form a part of the modified pigment are exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, $Mg^{2+}$, $Cl^-$, $NO_3^-$, $NO_2^-$, acetate, and $Br^-$.

The inkjet ink compositions of the present invention can be formed with a minimum of additional components (additives and/or cosolvents) and processing steps. Suitable additives may be incorporated into these inkjet ink compositions to impart a number of desired properties while maintaining the stability of the compositions. For example, surfactants may be added to further enhance the colloidal stability of the composition. Other additives are well known in the art and include humectants, biocides, binders, drying accelerators, penetrants, and the like. The amount of a particular additive will vary depending on a variety of factors but are generally present in an amount ranging between 0% and 40%.

Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The present invention further relates to a method of generating an image. In one embodiment, this method comprises the steps of: i) incorporating into a printing apparatus an inkjet ink composition comprising a) a liquid vehicle, b) a colorant, and c) a gelling agent; ii) jetting the inkjet ink composition; and iii) generating an image onto a substrate. The substrate may optionally comprise a gelling agent, which can be the same or different gelling agent than that in the inkjet ink composition. The liquid vehicle, colorant, and gelling agent are as described above. Any suitable printing apparatus capable of jetting the inkjet ink composition can be used. Suitable inkjet printers include, for example, thermal printers, piezoelectric printers, continuous printers, valve printers and the like. Similarly, any suitable substrate can be employed including plain papers, bonded papers, coated papers, transparency materials, textile materials, plastics, polymeric films, inorganic substrates and the like.

For this first embodiment, the method of generating an image of the present invention may further comprise the step of jetting a gelling composition. A gelling composition, as used herein, is defined to have a physical and/or chemical property that will cause the printed image to gel.

Thus, for example, the gelling composition may have a pH that is effective to cause the gelling of the image. The pH of the gelling composition can be either higher or lower than that of the inkjet ink composition, depending on the nature of the gelling agent used in the inkjet ink composition. However, the difference in pH between the inkjet ink composition and the gelling composition is large enough that the image gels.

Alternatively, the gelling composition may comprise a liquid vehicle which is effective to cause the gelling of the image. Thus, the liquid vehicle of the gelling composition may comprise one or more components which are different from that of the inkjet ink composition. For example, if the vehicle of the inkjet ink composition is water, the gelling composition may comprise water and a water miscible solvent, such as an alcohol, which is capable of gelling the image. Other combinations of vehicles will also be known to one skilled in the art and will depend on the nature of the gelling agent.

The step of jetting the gelling composition can occur either before or after the jetting of the inkjet ink composition. It may also occur both before and after the jetting of the inkjet ink composition, thereby forming essentially a "sandwich structure" with the inkjet ink composition in between two jetted "layers" of the gelling composition.

The method of generating an image of the present invention may further comprise the step of changing the temperature of the image to a level effective to cause the gelling of the image. Preferably, the temperature is increased. The amount of increase in temperature will depend on a variety of factors including the type and concentration of the gelling agent, the nature of the liquid vehicle, and the substrate.

The method of generating an image of the present invention may further comprise the step of jetting a gelling agent composition comprising at least one gelling agent. The gelling agent can be any of those that are described above. As noted above, the gelling agent of the gelling agent composition may be the same or different than that of the inkjet ink composition.

In a second embodiment, the present invention further relates to a method of generating an image comprising the steps of: i) incorporating into a printing apparatus an inkjet ink composition comprising a) a liquid vehicle and b) a colorant; ii) incorporating into a printing apparatus a gelling agent composition comprising a) a liquid vehicle and b) a gelling agent; iii) jetting, in any order, the inkjet ink composition and the gelling agent composition; and iv) generating an image onto a substrate. The liquid vehicle, colorant, gelling agent, printing apparatus, and substrate are as described above. The liquid vehicle of the inkjet ink composition and the gelling agent composition may be the same or different.

For this second embodiment, the method of generating an image may further comprise the jetting of a second gelling agent composition comprising a) a liquid vehicle and b) a gelling agent. The liquid vehicle and gelling agent of the second gelling agent composition may be the same or different from those of the first gelling agent composition. Preferably, the step of jetting the second gelling agent composition occurs after the jetting of the inkjet ink composition and the first gelling agent composition. Most preferably, the inkjet ink composition is jetted after the first gelling agent composition, which is then followed by the jetting of the second gelling agent composition. Since, in this preferred method, only the gelling agent compositions comprise a gelling agent, this allows the formation of a "sandwich structure with the inkjet ink composition between the two gelling agent compositions.

In a third embodiment, the present invention relates to a method of generating an image comprising the steps of: i) incorporating into a printing apparatus an inkjet ink composition comprising a) a liquid vehicle and b) a colorant; ii) jetting the inkjet ink composition; and iii) generating an image, wherein the substrate comprises at least one gelling agent. The gelling agent can be within the substrate or, more preferably, is a coating on the substrate. The substrate, as described above, is any suitable substance for generating an image, such as, plain paper, bonded paper, coated paper, and the like. The gelling agent can be applied to the substrate using any method know to one skilled in the art, such as, for example, dipping, coating, solvent deposition, jetting, or the like.

While not wishing to be bound by theory, it is believed that the gelling agent present in the printed image forms a network or gel upon printing, particularly under any of the conditions described above. Thus, for example, the gelling agent undergoes a chemical and/or physical change by coming in contact with a second inkjet ink composition of a different pH. The result is the formation of a gelled network within the printed image. Thus, the resulting images would have improved overall properties such as optical density, gloss, and durability (smearfastness and waterfastness).

The present invention will be further clarified by the following examples which are intended to be only exemplary in nature.

EXAMPLES

The following examples describe the use of gelling agents in accordance with the present invention and, for the purposes of these examples, the use of hydrophobically modified terpolymer gelling agents with modified pigments as the colorant. The gelling agents used are terpolymers containing methacrylic acid (about 10–49 mol %), ethyl acrylate (about 10–50 mol %), and a hydrophobically modified macromonomer (about 1–20 mol %). The macromonomer is composed of α-methylstyrene monomer and a hydrophobe connected via a poly(ethylene oxide) spacer. A general formula for this gelling agent is shown in FIG. 1.

It is known that in basic solutions (pH>8), the methacrylic acid monomer units are fully ionized, and the gelling agent becomes soluble. However, the terpolymer is also a polyelectrolyte. At high pH, its dimensions increase due to a "same-charge" repulsion, and the polymer chain opens or swells. This increases the intermolecular associations between the hydrophobic monomer units, leading to the formation of a polymer network or gel. Thus, the gelling of this gelling agent is promoted by an increase in pH.

Example 1

Cab-O-Jet® 300 black dispersion (available from Cabot Corporation) was dried in an oven to obtain a powdery modified pigment. 1.2 g of the modified pigment was mixed with 15.2 g of a UCAR® TR-115 polymer suspension (available from the Dow Chemical Corp., UCAR Emulsion Systems) having an initial solids content of 39.4 wt %, a pH of 2.63, and a mean particle size of 271 nm. UCAR® polymer suspensions contain terpolymers having the general structure shown in FIG. 1. The mixture was vigorously stirred overnight using a magnetic stirrer at a high speed. The resulting mixture was an ink composition containing 4.0 wt % modified pigment, 58.0 wt % water, and 37.6 wt % gelling agent.

Figure 2:
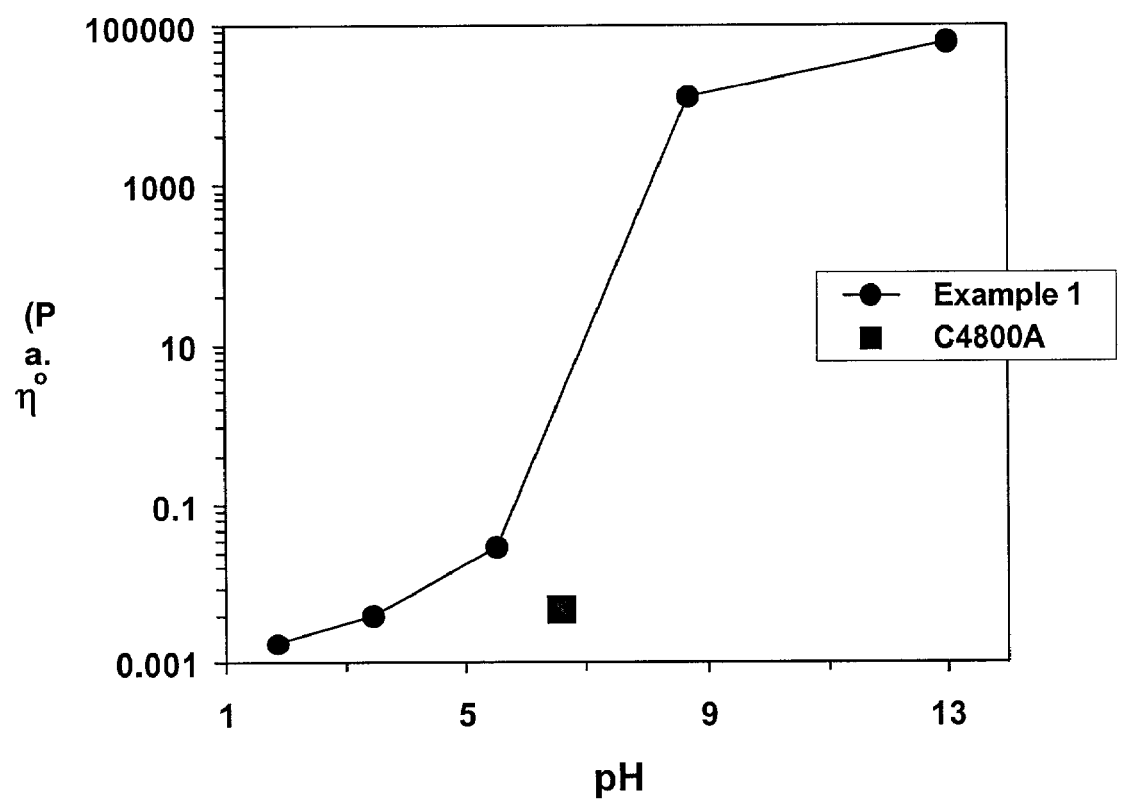
FIG. 2 is a plot of viscosity versus pH of an inkjet ink composition comprising a hydrophobically modified terpolymer gelling agent and a modified pigment.

The change in equilibrium viscosity with pH of this ink composition was measured. The pH of the suspension was adjusted by the addition of either 10 M NaOH or concentrated HCl, as needed, followed by equilibration by stirring overnight. The viscosity of the resulting composition was measured using a controlled stress Carri-Med Rheometer (TA Instruments) with a cone and plate geometry system (cone parameters: diameter, 4 cm; angle, 2°, truncation, 56 μm) equipped with a solvent trap. An initial stress of 0.6 Pa was applied throughout. The results are shown in FIG. 2.

As can be seen, the viscosity of the ink composition increased by about 7 orders of magnitude with increasing pH. Yet, at a pH below the $pK_a$ of the COOH groups in the UCAR® copolymer, the ink composition was no more viscous than a commercially available carbon black pigment-based inkjet ink (HP C4800A available from Hewlett-Packard Corp.), shown by the square in FIG. 2. Therefore, this ink composition could be jetted at low pH, and would therefore function as an inkjet ink composition. If jetted onto a substrate capable of causing an increase in pH, the resulting printed image would gel. Such an image would be expected to have improved print performance, particularly durability.

Examples 2–6

In the following examples, suspensions of the UCAR® polymers, with properties as shown in Table 1, were mixed with a dried modified pigment (prepared from Cab-O-Jet® 300 black dispersion) as described in Example 1. The resulting ink compositions are shown in Table 2. Properties of these ink compositions are shown in Table 3.

TABLE 1

| UCAR polymer | Solids Content (wt %) | pH | Particle Size mean diameter (nm) | 50% (nm) | 100% (nm) |
|---|---|---|---|---|---|
| TR-115 | 39.4 | 2.6 | 254.7 | 230.2 | 1635 |
| TR-116 | 39.9 | 2.5 | 445.1 | 266.6 | 5500 |
| TR-117 | 40 | 2.4 | 357.5 | 285.6 | 2313 |
| 106HE | 24.9 | 2.4 | 137.8 | 108.7 | 1156 |
| 107 | 24.0 | 2.9 | 223 | 218.6 | 436.1 |

TABLE 2

| Example # | Gelling Agent Type | wt % Gelling Agent | wt % Colorant |
|---|---|---|---|
| 2 | TR-115 | 37.8 | 4 |
| 3 | TR-116 | 38.3 | 4 |
| 4 | TR-117 | 38.4 | 4 |
| 5 | 106HE | 23.9 | 4 |
| 6 | 107 | 23.9 | 4 |

TABLE 3

| Example # | Viscosity (cP) | pH | Particle Size mean diameter (nm) | 50% (nm) | 100% (nm) |
|---|---|---|---|---|---|
| 2 | 1.70 | 3.60 | 271 | 237 | 1116 |
| 3 | 6.21 | 3.46 | 342 | 277 | 3888 |
| 4 | 3.62 | 3.27 | 429 | 349 | 1945 |
| 5 | 1.50 | 3.38 | 265 | 169 | 1946 |
| 6 | 1.40 | 4.02 | 276 | 241 | 972 |

As seen from Table 3, the viscosities of the ink compositions at the pH shown are similar to that of a commercially available inkjet ink composition (for example, the viscosity of an HP 4800 cartridge inkjet ink is approximately 5 cp.). Therefore, these ink compositions would be suitable and effective as inkjet ink compositions.

The inkjet ink composition of Example 4 was printed using a Hewlett Packard Professional Series Model 2000C Inkjet printer, demonstrating the jettability of the inkjet ink composition. Similar results would be expected for the inkjet ink compositions of Examples 2, 3, 5, and 6.

Examples 7–11

Inkjet ink compositions were prepared similar to those described in Examples 2–6, except that 1,5-pentanediol humectant was also added (15 wt % of the humectant in each ink). The resulting inkjet ink compositions are shown in Table 4, along with the resulting properties.

TABLE 4

| Example # | Gelling Agent Type | wt % Gelling Agent | Wt % Colorant | wt % Humectant | pH | Viscosity |
|---|---|---|---|---|---|---|
| 7 | TR-115 | 31.9 | 4 | 15 | 4.01 | 6.034 |
| 8 | TR-116 | 32.3 | 4 | 15 | 3.96 | Phase separated |
| 9 | TR-117 | 32.4 | 4 | 15 | 3.84 | 115 |
| 10 | 106HE | 20.2 | 4 | 15 | 4.28 | 1.958 |
| 11 | 107 | 20.2 | 4 | 15 | 4.42 | 7.47 |

Each of the inkjet ink compostions listed in Table 4 was tested for printability using a drawdown technique in which a Wire-Cator #3 (a wire-bar with wire diameter, 0.075 mm, film thickness, 5 mm; Leneta Company, Mahwah, N.J.) was used to apply the inkjet ink composition to a substrate (Xerox Premium Multipurpose 4024 Paper). In addition, for each composition, an "underprinted" sample was also prepared. Thus, a gelling composition consisting of a 15 wt % solution of 1,5-pentane diol in 0.1 M NaOH was first applied to the substrate using the drawdown technique and dried. The inkjet ink compositions shown in Table 4 were then applied to this "underprint" also using the drawdown technique. The final prints were allowed to dry for 5 minutes prior to performance testing.

The resulting samples were then tested for optical density (OD), waterfastness (WF), and smearfastness (SF). Optical density was measured using a Macbeth densitometer and averaged over 5 measurements. Waterfastness was measured by comparing the optical density of a water trail (0.25 ml of DI water) after the print had dried (time 0) to that after 5 minutes in the immediate proximity. The waterfastness was then expressed as a ratio of the OD of the water trail after 5 minutes to that time 0. The lower the value, the better the waterfastness. Smearfastness was measured by highlighting across the printed region and onto a clear unprinted area. This was done twice (2-pass test). Smearfastness was then expressed as the ratio of the optical density of the highlighter trail to the initial optical density. Two different highlighters were used: an orange major Sanford fluorescent (pH 4.4, Sanford Co.), and a yellow Hi-Liter Fluorescent Marker #240XX (pH 9.2, Avery Co.). The lower the value, the better the smearfastness. The results of the performance testing are shown in Table 5.

TABLE 5

| | Average | | | | Smearfastness | | | |
|---|---|---|---|---|---|---|---|---|
| | OD Underprint? | | WF Underprint? | | Yellow Underprint? | | Orange Underprint? | |
| Ex. # | no | Yes | no | yes | no | Yes | no | yes |
| 7 | 1.88 | 2.08 | 0.30 | 0.11 | 0.13 | 0.14 | 0.09 | 0.09 |
| 8 | 1.94 | 2.08 | 0.80 | 0.14 | 0.17 | 0.13 | 0.14 | 0.13 |
| 9 | 2.24 | 2.28 | 0.56 | 0.27 | 0.32 | 0.51 | 0.38 | 0.40 |
| 10 | 1.85 | 1.83 | 0.24 | 0.20 | 0.31 | 0.13 | 0.20 | 0.08 |
| 11 | 1.75 | 1.68 | 0.32 | 0.14 | 0.23 | 0.20 | 0.12 | 0.28 |
| Comp Ex. | 1.18 | 1.18 | 0.08 | 0.55 | 0.21 | 0.38 | 0.20 | 0.24 |

For the Comparative Example, the same procedure as that described above was followed using a Hewlett-Packard C4800A cartridge inkjet ink.

As can be seen from Table 5, the optical density (OD) of the inkjet ink compositions of the present invention exceeded that of the Comparative Example, with or without an underprint layer. The waterfastness of the Comparative Example was lower on the paper without underprinting compared to the waterfastness of the inkjet ink compositions of Examples 7–11, which would be expected since the OD of the Comparative Example is also much lower. However, as seen in Table 5, the waterfastness of the inkjet ink compositions of Examples 7–11 could be improved with the use of an underprint layer. In fact, the waterfastness of the inkjet ink compositions of the present invention with underprinting was lower than the Comparative Example, even though they also had considerably higher OD than the Comparative Example. As such, the inkjet ink compositions of the present invention did not sacrifice OD for improved waterfastness and vice versa. In addition, smearfastness of the present inkjet ink compositions was comparable or better than that of the Comparative Example, also despite their differences in OD. Moreover, most of the images prepared using the inkjet ink compositions of the present invention also had a glossy texture, which was not observed with the ink of the Comparative Example. These examples demonstrate that the inkjet ink systems of the present invention comprising at least one gelling agent provide improved print properties over standard inkjet ink systems and are effective inkjet ink systems with or without the use of an underprint layer.

Examples 12–16

Compositions containing 20 wt % of the UCAR® materials shown in Table 1 as the gelling agents and 4% modified pigment (prepared from Cab-O-Jet® 300 black dispersion) were prepared using the procedure describe in Example 1, with the addition of a humectant (15 wt %). The viscosities of the compositions were measured as described in Example 1, and the results are shown in Table 6.

TABLE 6

| Humectant | Example 12 (TR-115) | Example 13 (TR-116) | Example 14 (TR-117) | Example 15 (106HE) | Example 16 (107) |
|---|---|---|---|---|---|
| 1,5-Pentane-diol | 13610 | 71.8 | 2689 | 181 | 1.5 |
| 2-Pyrrolidinone | 23.4 | 1.8 | 31.8 | 2.8 | 1.8 |
| Diethyleneglycol | 5.4 | 244300 | 151.4 | 1.8 | 1.8 |
| Ethylene glycol | 3.6 | 5.2 | 15.5 | 2.1 | 1.8 |

As can be seen from Table 6, ethylene glycol did not cause significant changes in the zero shear viscosity for all but one sample, while 1,5-pentanediol caused dramatic viscosification and gelation of all but one sample.

Figure 3:
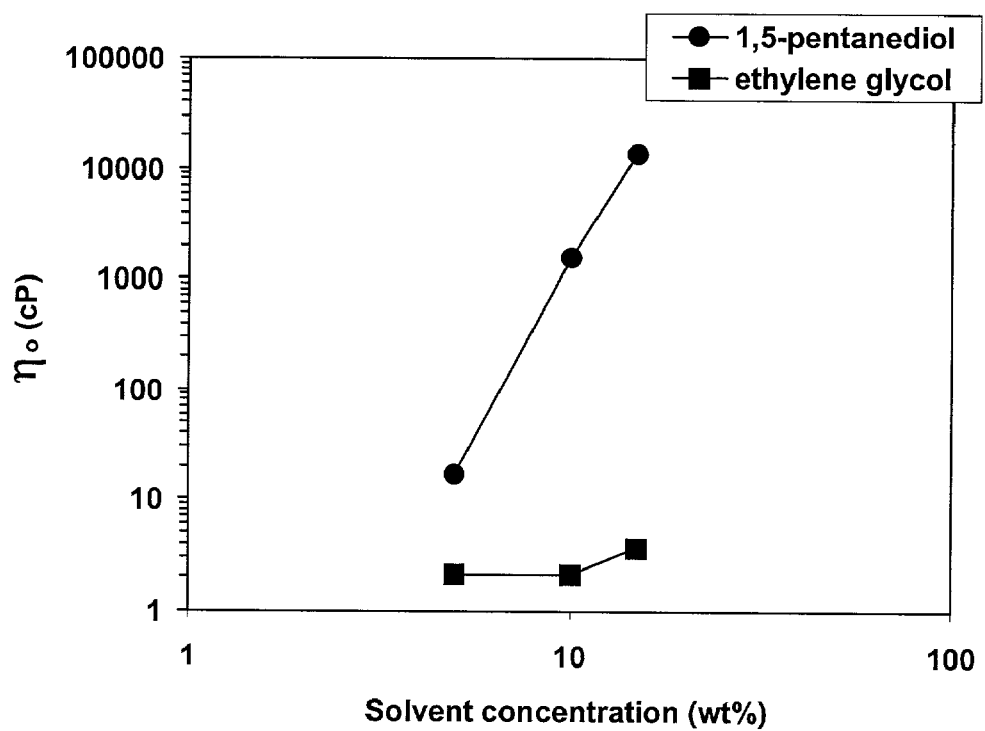
FIG. 3 is a plot of viscosity versus humectant concentration of an inkjet ink composition comprising a hydrophobically modified terpolymer gelling agent and a modified pigment.

The change in viscosity with concentration of humectant was measured following the procedure described in Example 1 using the composition of Example 12. The results for 1,5-pentanediol and ethylene glycol are shown in FIG. 3. These examples confirm the selectivity of the gelling agent for different humectants.

Examples 17–21

Compositions were prepared similar to those of Examples 12–16 containing 5 wt % ethylene glycol and 0.1% Surfonyl 465 surfactant. These were printed following the procedure described in Examples 7–11. Print samples were prepared by first applying an underprint using a second composition (15 wt % 1,5-pentanediol in 0.1 M NaOH) on the substrate (Xerox Premium Multipurpose 4024 Paper) followed by applying the compositions described above.

Optical density and waterfastness were measured as described above. The results of the testing of the printed images are shown in Table 7.

TABLE 7

| | Optical Density Underprint? | | Waterfastness Underprint? | |
|---|---|---|---|---|
| | no | yes | No | yes |
| Example 17 | | | | |
| Average | 1.720 | 1.650 | 0.070 | 0.070 |
| St. Dev. | 0.088 | 0.037 | 0.015 | 0.008 |
| Example 18 | | | | |
| Average | 1.652 | 1.766 | 0.080 | 0.070 |
| St. Dev. | 0.057 | 0.024 | 0.010 | 0.007 |
| Example 19 | | | | |
| Average | 1.644 | 1.704 | 0.172 | 0.074 |
| St. Dev. | 0.065 | 0.143 | 0.071 | 0.015 |
| Example 20 | | | | |
| Average | 1.678 | 1.888 | 0.102 | 0.074 |
| St. Dev. | 0.054 | 0.083 | 0.024 | 0.011 |
| Example 21 | | | | |
| Average | 1.588 | 1.766 | 0.082 | 0.072 |
| St. Dev. | 0.043 | 0.023 | 0.019 | 0.022 |

As can be seen from Table 7, in all cases but one, the optical density obtained from the underprinted samples was higher than those without underprinting, and the waterfastness of the underprinted samples was reproducibly higher (i.e. the water trail was lighter) in the underprinted samples. These examples demonstrate the use of a second inkjet ink composition comprising a liquid vehicle effective to cause the gelling of the image.

As noted from the examples above, the inkjet ink systems described herein have been shown to produce inkjet ink compositions that are capable of generating images with improved print properties.

What is claimed is:

1. An inkjet ink system comprising: a) a liquid vehicle; b) a colorant; and c) a gelling agent, wherein the colorant is a modified pigment comprising a pigment having attached at least one organic group and the gelling agent is a hydrophobically modified polyelectrolyte having a weight average molecular weight of between 300,000 and 1,500,000.

2. The inkjet ink system of claim 1, wherein the organic group comprises at least one ionic group, ionizable group, or mixtures thereof.

3. The inkjet ink system or claim 2, wherein the organic group comprises a carboxylic acid group, a sulfonic acid group, a phosphonic acid group, or salts thereof.

4. The inkjet ink system of claim 1, wherein the liquid vehicle is an aqueous vehicle or a non-aqueous vehicle.

5. The inkjet ink system of claim 1, wherein the pigment is a blue pigment, a black pigment, a brown pigment, a cyan pigment, a green pigment, a white pigment, a violet pigment, a magenta pigment, a red pigment, an orange pigment, a yellow pigment, shades thereof, or mixtures thereof.

6. The inkjet ink system of claim 1, wherein the pigment is carbon blank.

7. The inkjet ink system of claim 1, wherein the gelling agent is a polymer comprising at least one hydrophobic monomer unit and at least one ionic or ionizable monomer unit.

8. The inkjet ink system of claim 7, wherein the gelling agent further comprises at least one hydrophilic monomer unit.

9. The inkjet ink system of claim 8, wherein the hydrophilic monomer unit comprises an alkylene oxide group.

10. The inkjet ink system of claim 7, wherein the gelling agent is a black copolymer or a graft copolymer.

11. The inkjet ink system of claim 7, wherein the hydrophobic monomer unit is an alkyl ester of acrylic acid or an alkyl ester of methacrylic acid.

12. The inkjet ink system of claim 7, wherein the ionic or ionizable monomer unit comprises a carboxylic acid group or salt thereof.

13. The inkjet ink system of claim 1, wherein the gelling agent is a hydrophobically modified terpolymer comprising methacrylic acid monomer units, ethyl acrylate monomer units, and a hydrophobically-modified macromer units comprising α-methylstyrene monomer units and a poly(ethylene oxide) group.

14. The inkjet ink system of claim 1, wherein the gelling agent is incorporated into liquid vehicle to form an inkjet ink composition.

15. The inkjet ink system of claim 14, wherein the gelling agent is present in an amount between 0.1% and 60.0% by weight based on the coral weight of the inkjet ink composition.

16. The inkjet ink system of claim 15, wherein the gelling agent is present in an amount between 1.0% and 50.0% by weight based on the total weight of the inkjet ink composition.

17. The inkjet ink system of claim 16, wherein the gelling agent is present in an amount between 5.0% and 40.0% by weight based on the total weight of the inkjet ink composition.

18. The inkjet ink system of claim 1, wherein the gelling agents is attached to the colorant.

19. An inkjet ink system comprising: a) a liquid vehicle; b) a colorant; and c) a gelling agent, wherein the colorant is a modified pigment comprising a pigment having attached at least one organic group and the gelling agent is a hydrophobically modified polyelectrolyte wherein the inkjet ink system comprises inkjet ink composition and second jettable composition, and wherein the gelling agent is incorporated into the second jettable composition.

20. An inkjet ink system comprising: a) substrate and a liquid vehicle; b) a colorant; and c) a gelling agent, wherein the colorant is a modified pigment comprising a pigment having attached at least one organic group and the gelling agent is a hydrophobically modified polyelectrolyte, wherein the gelling agent is a component of the substrate or is a coating on the surface of the substrate.

21. A method of generating a printed image comprising the steps of:
    i) incorporating into a printing apparatus an inkjet ink composition comprising: a) a liquid vehicle, b) a colorant, and c) a gelling agent, wherein the colorant is a modified pigment comprising a pigment having attached at least one organic group and wherein the organic group comprises at least one ionic group, ionozable group, or mixtures thereof, and the gelling is a hydrophobically modified polyelectrolyte having a weight average molecular weight of between 300,000 and 1,500,000;
    ii) jetting the inkjet ink composition; and
    iii) generating an image onto a substrate, wherein the substrate optionally comprises a gelling agent.

22. The method of claim 21, further comprising the step of jetting a gelling composition, wherein the gelling composition comprises a liquid vehicle effective to cause the gelling of the image.

23. The method of claim 22, wherein the step of jetting a gelling composition occurs before step ii).

24. The method of claim 22, wherein the step of jetting a gelling composition occurs after step ii).

25. The method of claim 21, further comprising the step of increasing the temperature to a level effective to cause the gelling of the image.

26. The method of claim 21, further comprising the step of increasing the temperature to a level effective to evaporate a portion of the liquid vehicle to cause the gelling of the image.

27. The method of claim 21, further comprising the step of jetting a gelling agent composition, wherein the gelling agent composition comprises at least one gelling agent.

28. A method of generating a printed image comprising the steps of:
    i) incorporating into a printing apparatus an inkjet ink composition comprising: a) a liquid vehicle, b) a colorant, and c) a gelling agent, wherein the colorant is a modified pigment comprising a pigment having attached at least one organic group and the gelling agent is a hydrophobically modified polyelectrolyte;
    ii) jetting the inkjet ink composition; and
    iii) generating an image onto a substrate, wherein the substrate optionally comprises a gelling agent,
further comprising the step of jetting a gelling composition, wherein the gelling composition has a pH effective to cause the gelling of the image.

29. The method of claim 28, wherein the step of jetting a gelling composition occurs before step ii).

30. The method of claim 28, wherein the step of jetting a gelling composition occurs after step ii).

31. A method of generating a printed image comprising the steps of:
    i) incorporating into a printing apparatus an inkjet ink composition comprising: a) a liquid vehicle and b) a colorant, wherein the colorant is a modified pigment having attached at least one organic group,
    ii) incorporating into a printing apparatus a gelling agent composition comprising: a) a liquid vehicle and b) a gelling agent, wherein the gelling agent is a hydrophobically modified polyelectrolyte;
    iii) jetting, in any order, the inkjet ink composition and the gelling agent composition, and
    iv) generating an image onto a substrate.

32. The method of claim 31, further comprising the step of jetting a second gelling agent composition comprising: a) a liquid vehicle and b) a gelling agent, wherein the step of jetting a second gelling agent composition occurs before the jetting of the inkjet ink composition.

33. A method of generating a printed image comprising the steps of:
    i) incorporating into a printing apparatus an inkjet ink composition comprising: a) a liquid vehicle and b) a colorant, wherein the colorant is a modified pigment having attached at least one organic group,
    ii) jetting the inkjet ink composition, and
    iii) generating an image onto a substrate, wherein the substrate comprises a gelling agent, wherein the gelling agent is a hydrophobically modified polyelectrolyte.

34. The method of claim 33, wherein the substrate comprises s coating of the gelling agent.

35. An inkjet ink system comprising: a) a liquid vehicle; b) a colorant; acid c) a gelling agent, wherein the colorant is a modified pigment comprising a pigment having attached at least one organic group and the gelling agent is a hydrophobically modified terpolymer having a weight average molecular weight at between 300,000 and 1,500,000 comprising methacrylic acid monomer units, ethyl acrylate monomer units, and a hydrophobically-modified macromer units comprising α-methylstyrene monomer units and a poly(ethylene oxide) group.

36. An inkjet ink system comprising: a) a liquid vehicle; b) a colorant; and c) a gelling agent, wherein the colorant is a modified pigment comprising a pigment having attached at least one organic group having the formula —X-Sp-[Polymer]R, wherein X, which is directly attached to the pigment, represents an arylene or heteroarylene group or an alkylene group, Sp represents a spacer group, Polymer represents a polymeric group comprising repeating monomer groups, and R represents hydrogen, a bond, a substituted or unsubstituted alkyl group, or a substituted or unsubstituted aryl group, and wherein the gelling agent is hydrophobically modified polyelectrolyte having a weight average molecular weight of between 300,000 and 1,500,000.

37. A method of generating a printed image comprising the steps of:

i) incorporating into a printing apparatus an inkjet ink corporation comprising: a) a liquid vehicle, b) a colorant, and c) a gelling agent, wherein the colorant is a modified pigment comprising a pigment having attached at least one organic group having the formula —X-Sp-[Polymer]R, wherein X, which is directly attached to the pigment, represents an arylene or heteroarylene group or an alkylene group, Sp represents a spacer group, Polymer represents a polymeric group comprising repeating monomer groups, and R represents hydrogen, a bond, a substituted or unsubstituted alkyl group, or a substituted or unsubstituted aryl group, and wherein the gelling agent is a hydrophobically modified polyelectrolyte having a weight average molecular weight of between 300,000 and 1,500,000;

ii) jetting the inkjet ink composition; and iii) generating an image onto a substrate, wherein the substrate optionally comprises a gelling agent.

* * * * *